United States Patent
Gorham et al.

(10) Patent No.: US 12,366,522 B2
(45) Date of Patent: Jul. 22, 2025

(54) COLORIMETER OPTICAL MEASUREMENT INTERFERENCE MITIGATION

(71) Applicant: Hach Company, Loveland, CO (US)

(72) Inventors: Russell Paul Gorham, Windsor, CO (US); Nelson E. Dervaes, Fort Collins, CO (US)

(73) Assignee: HACH COMPANY, Loveland, CO (US)

(*) Notice: Subject to any disclaimer, the term of this patent is extended or adjusted under 35 U.S.C. 154(b) by 179 days.

(21) Appl. No.: 18/344,436

(22) Filed: Jun. 29, 2023

(65) Prior Publication Data
US 2024/0011896 A1    Jan. 11, 2024

Related U.S. Application Data

(60) Provisional application No. 63/359,034, filed on Jul. 7, 2022.

(51) Int. Cl.
G01N 21/25    (2006.01)

(52) U.S. Cl.
CPC ....... G01N 21/251 (2013.01); *G01N 2201/12* (2013.01)

(58) Field of Classification Search
CPC .... G01N 21/272; G01N 21/274; G01N 21/78; G01N 21/251; G01N 21/82; G01N 2201/1248; G01N 2201/12; G01N 2201/1245; G01N 15/075
See application file for complete search history.

(56) References Cited

U.S. PATENT DOCUMENTS

| | | | | |
|---|---|---|---|---|
| 5,192,984 A | * | 3/1993 | Beecher | G01N 1/44 356/427 |
| 5,550,053 A | * | 8/1996 | Salpeter | G01N 21/274 250/252.1 |
| 7,075,653 B1 | | 7/2006 | Rutherford | |
| 2003/0128371 A1 | * | 7/2003 | Vaux | G01N 13/02 356/601 |

(Continued)

FOREIGN PATENT DOCUMENTS

EP    1335028 A2    8/2003

OTHER PUBLICATIONS

Nadine et al "Apparatus For Monitoring Bacteriological Quality of Water", Nov. 15, 1995, EP 0682244 A1. (Year: 1995).*

(Continued)

*Primary Examiner* — Sang H Nguyen
(74) *Attorney, Agent, or Firm* — Ference & Associates LLC

(57) ABSTRACT

An embodiment provides a method for measuring an analyte of a sample using a colorimeter, including: introducing the sample into a measurement chamber of the colorimeter, wherein the measurement chamber comprises an optical path from a light source to an optical sensor; identifying and waiting a sample settling period, wherein the sample settling period comprises a dynamic length of time, wherein the identifying comprises: measuring, using the optical sensor, a light throughput of the sample; and determining, based upon the measuring, the light throughput has reached a stable baseline; and obtaining a reference measurement of the sample when the stable baseline is reached. Other aspects are described and claimed.

16 Claims, 12 Drawing Sheets

(56) References Cited

U.S. PATENT DOCUMENTS

| | | | |
|---|---|---|---|
| 2005/0101028 A1 | 5/2005 | Kawamura et al. | |
| 2007/0035734 A1* | 2/2007 | Muller | G02B 21/0044 356/432 |
| 2015/0233816 A1* | 8/2015 | Jakli | G01N 21/23 356/319 |
| 2016/0084759 A1* | 3/2016 | Hall | G01N 21/0303 356/338 |
| 2017/0315039 A1* | 11/2017 | Beil | G01N 15/0211 |
| 2021/0209497 A1* | 7/2021 | Wang | A61B 5/1495 |

OTHER PUBLICATIONS

European Patent Office, International Search Report and Written Opinion, Oct. 5, 2023, 13 pages, European Patent Office.

\* cited by examiner

COLORIMETER OPTICAL MEASUREMENT INTERFERENCE MITIGATION

CROSS REFERENCE TO RELATED APPLICATION

This application claims priority to U.S. Provisional Patent Application Ser. No. 63/359,034, filed on Jul. 7, 2022, and entitled "COLORIMETER OPTICAL MEASUREMENT INTERFERENCE MITIGATION," the contents of which are incorporated by reference herein.

FIELD

This application relates generally to optical measurement of an analyte in a solution, and, more particularly, to measurement of a stable baseline prior to an optical measurement.

BACKGROUND

Ensuring water quality is critical in a number of industries such as pharmaceuticals and other manufacturing fields. Additionally, ensuring water quality is critical to the health and well-being of humans, animals, and plants which are reliant on the water for survival. An analyte of the water may be measured as an indication of the quality of the sample. Measurement may allow for identification or computation of other parameters of the sample, for example, buffering capacity, a component of the sample, or the like, which allows for identifying the overall quality of the water. The number of different parameters that can be tested for is large, with most parameters requiring the use of a different chemistry or test instrument for testing. One method to measure a component or analyte of the sample is to use a colorimeter or other optical based measurement instrument.

BRIEF SUMMARY

In summary, one embodiment provides a method for measuring an analyte of a sample using a colorimeter, comprising: introducing the sample into a measurement chamber of the colorimeter, wherein the measurement chamber comprises an optical path from a light source to an optical sensor; identifying and waiting a sample settling period, wherein the sample settling period comprises a dynamic length of time, wherein the identifying comprises: measuring, using the optical sensor, a light throughput of the sample; and determining, based upon the measuring, the light throughput has reached a stable baseline; and obtaining a reference measurement of the sample when the stable baseline is reached.

Another embodiment provides a measurement device for measuring an analyte of a sample using a colorimeter, comprising: a measurement chamber; a light source; an optical detector; a processor; and a memory device that stores instructions executable by the processor to: introduce the sample into the measurement chamber of the colorimeter, wherein the measurement chamber comprises an optical path from the light source to the optical sensor; identify and wait a sample settling period, wherein the sample settling period comprises a dynamic length of time, wherein the identifying comprises: measuring, using the optical sensor, a light throughput of the sample; and determining, based the measuring, the light throughput has reached a stable baseline; and obtain a reference measurement of the sample when the stable baseline is reached.

A further embodiment provides a product for measuring an analyte of a sample using a colorimeter, comprising: a storage device having code stored therewith, the code being executable by the processor and comprising: code that introduces the sample into a measurement chamber of the colorimeter, wherein the measurement chamber comprises an optical path from a light source to an optical sensor; code that identifies and waits a sample settling period, wherein the sample settling period comprises a dynamic length of time, wherein the identifying comprises: measuring, using the optical sensor, a light throughput of the sample; and determining, based upon the measuring, the light throughput has reached a stable baseline; and code that obtains a reference measurement of the sample when the stable baseline is reached.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1A:
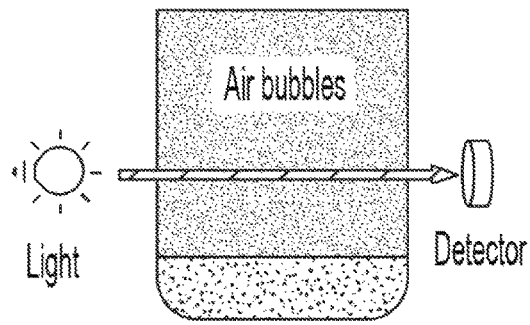
FIG. 1A illustrates a diagram of changing turbidity from a presence of bubbles in an optical path of an analyzer for measuring an analyte of a sample.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail. The following description is intended only by way of example, and simply illustrates certain example embodiments.

Optical measurement instruments, such as a colorimeter or the like, pass light through a sample for measurement. A specific wavelength may be used for different analytes. A measurement may be taken prior to and after a colorimetric reaction to detect an analyte. The measurement of light passing through after the colorimetric reaction may be due to the reaction of the analyte with the chemistry of the colorimetric reaction. However, the presence of turbidity or changing turbidity in the sample may also block or refract light. As an example, changing turbidity may be due to air bubbles. The presence of turbidity may interfere with a precise measurement of an analyte. If the turbidity in a sample remains consistent, then the impact on a measurement would be lessened. Turbidity may also be affected by biofilm, meniscus of a fluid, or the like in an optical path. A changing turbidity may be referred to as a transient turbidity. For example, air bubble may rise out of a sample and clear an optical path making the turbidity change transient.

However, in reality turbidity rarely remains static and changes during the course of a measurement and impacts a measurement by blocking light at the beginning of a reference measurement, and disappears at the end of the measurement or at the end of the reaction. Thus, the differential between the two measurements is reduced. In other words, some of the light blocking of the reaction for the end measurement is masked by the presence of turbidity at the reference measurement. The presence of turbidity may depend on many conditions such as location, season, sample source, temperature, pressure, altitude, impurities, or the like.

Figure 1B:
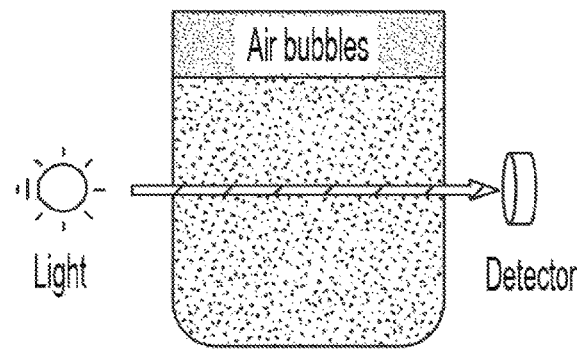
FIG. 1B illustrates a diagram of changing turbidity in an optical path from a clearing of bubbles of an analyzer for measuring an analyte of a sample.

Turbidity or changing turbidity can create optical noise during the reference measurements of process analyzers, resulting in measurement bias or failed measurements. Optical noise may be the result of turbidity or changing turbidity. Noise as disclosed herein may refer to optical noise. For ease of reading, air bubbles in the form of dissolved/entrained gas may be an example of a changing or transient turbidity of a sample. Other examples of a changing turbidity may include optical interference due to solid particles, immiscible liquids, or the like. The optical noise comes from the air bubbles passing through the optical path as they rise to the surface in the measurement chamber after the water sample has been dispensed (See FIG. 1A). As the air dissipates, more light from the emitter or light source makes it to the detector (See FIG. 1B). If the air bubbles have not moved out of the optical path before the reference measurement begins, the reference measurement will be lower than it should be. This can be monitored by calculating the noise during the reference measurement. If the noise from air bubbles in the water sample exceeds the allowable threshold, the instrument will measure lower than the actual concentration of the analyte. Many analyzers include diagnostics to ensure this noise is below an acceptable level. When the threshold is exceeded, the analyzer will alert the user and in some cases it will stop operating until the problem is resolved.

Figure 1C:
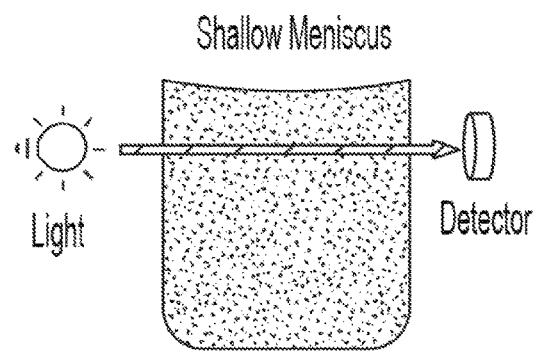
FIG. 1C illustrates a diagram of a shallow meniscus and an optical path of an analyzer for measuring an analyte of a sample.
Figure 1D:
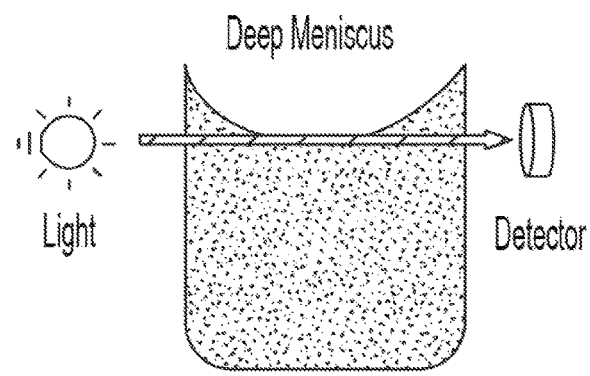
FIG. 1D illustrates a diagram of a deep meniscus, for example from accumulation of biofilm, and an optical path of an analyzer for measuring an analyte of a sample.

For instruments measuring ultra-pure water, a similar effect has been seen due to movement in the water sample during the reference measurement which is caused by bio-growth in the water. The bio-growth can pull the meniscus deep enough to impact the optical path (See FIG. 1D). A more typical meniscus in the absence of biofilm may be shallower (See FIG. 1C). Bio-growth in the cell may result in a number of conditions that increase the noise in the optical measurement. Similar to air bubbles, the impact on the optical path may be transient. In other words, biofilm may wick sample volume up a chamber and out an overflow drain.

Accordingly, the systems and methods described herein provide a technique for analyte measurement in a sample once a stable optical reading is established. In an embodiment, a fixed-duration sample settling step may be replaced with an adjustable time based on diagnostics. The step may start with a very short sample settling segment that measures the noise, then extends or repeats the settling portion if there is too much noise to make an accurate measurement. For fixed-duration measurement cycles, make-up time can be added at the end of the cycle to compensate for the use/non-use of extending the settling time.

In an embodiment, for nonfixed-duration measurement cycles, this loop can be repeated as many times as is feasible to allow for a good measurement. Facilities without turbidity issues would benefit from a faster measurement cycle. The instrument could provide an alert or notification if the additional settling time is being used consistently or if the additional time exceeds a threshold. A diagnostic loop can allow analyzers with a good water sample to measure more quickly, while allowing those with problematic water sample to function as intended, with better accuracy and fewer failed measurements and/or diagnostic alerts.

In an embodiment, a wait time may be added to the measurement cycle. The wait time may allow turbidity to rise or fall to a position so as to not interfere with an optical measurement. For example, a wait time of 12 seconds may be used. This may be referred to as a fixed measurement cycle. However, a fixed time such as 12 seconds may not allow for turbidity to clear from an optical measurement in all conditions. In an embodiment, the method and system may use diagnostic measurement to determine when bubbles or turbidity no longer interfere with an optical measurement. In other words, light throughput may be used as a measure of bubbles or particles in the optical path. Described herein are embodiments of using diagnostic measurement to confirm bubbles or particles have moved out of the optical path. A continuous monitoring of light output to determine a change or lack of change in light throughput may be correlated to bubbles or particles in the optical light path. A stable throughput of light may indicate the bubbles or particles have moved from the light path. A stable baseline of optical measurement may be referred to as sample stability. Sample stability may be affected by air bubbles, biofilm, colorimetric chemistry reaction time, temperature of a sample, changes in solubility, solid particles, or the like.

The illustrated example embodiments will be best understood by reference to the figures. The following description is intended only by way of example, and simply illustrates certain example embodiments.

Figure 2:
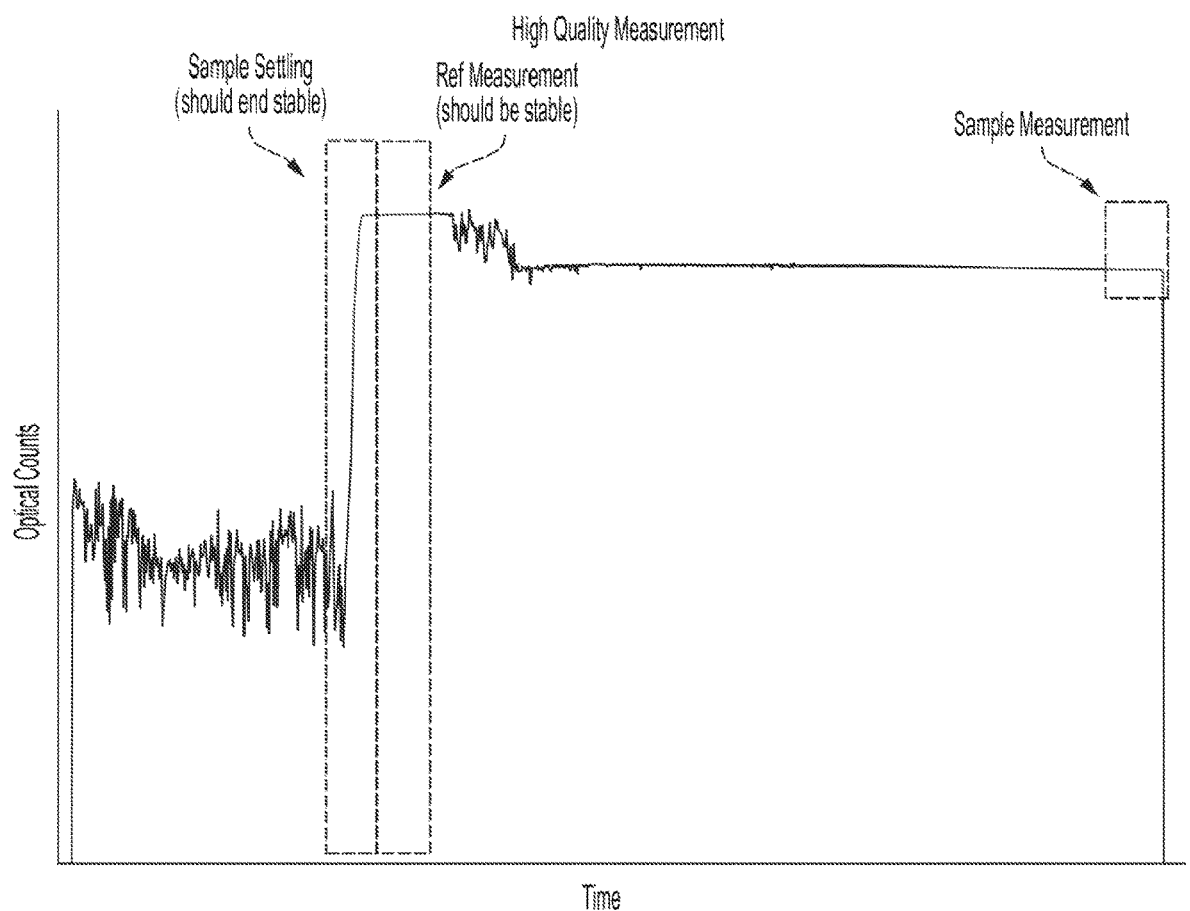
FIG. 2 illustrates example data of optical measurement over time for measuring an analyte of a sample.

Referring to FIG. 2, in an embodiment, sample data from a sample plotting light output over time is illustrated. The light output may be an electrical signal from an optical sensor. The trace begins as a noisy baseline, and then reaches a newer and quiet baseline after bubbles clear from the light path. As an example, the turbidity caused by bubbles or particles may be introduced with the sample upon the initial loading of a sample into a measurement chamber. There may be a flushing cycle of a measurement chamber prior to measurement of another sample. Another portion of the trace, the sample settling area, is a transition from noisy to a stable reading. For example, optical measurement may be around 2 million counts as a new stable baseline occurs.

The next portion of the trace, the reference measurement area is where a reference optical reading may be obtained. For example, 48 optical measurements may be acquired, at about 0.25 second intervals in this reference phase. As an example, some of the highest and lowest measurements may be excluded, and the remainder averaged. A standard deviation may be calculated to confirm a stable measurement. In other words, if the variation of the baseline is within a set limit for the optical counts, the measurement may proceed and be deemed accurate. After a period of reference measurement, the noisy period may be due to injection of chemical reagent and a stirring mechanism. The protocol described is an example, the number of readings, interval, and noise limit may be adjusted. Next, the system waits for the chemistry to react for a given analyte for colorimetric measurement. This period between the reference and sample measurements varies based on the chemistry involved and the analyte to be measured.

Then, a sample measurement may be obtained at a new value. The difference between the reference and sample measurement may be correlated to an amount of analyte in is a sample. The reference and sample measurements may be taken during quiet periods of the trace for an accurate measurement of an analyte. The system and method may prevent a lower optical reading at the reference measurement due to bubbles in the optical path which gives an incorrect and lower than actual measurement of an analyte.

Figure 3:
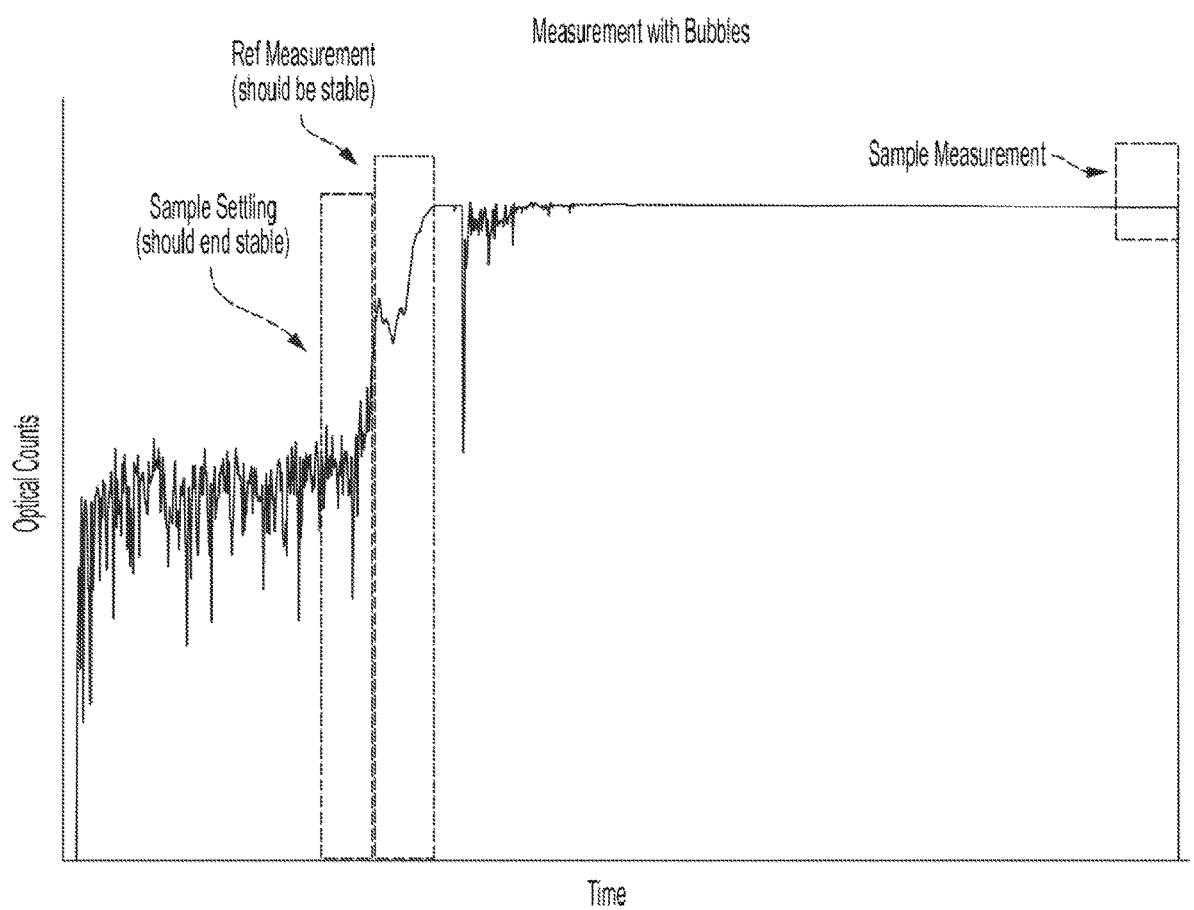
FIG. 3 illustrates example data of optical measurement over time for measuring an analyte of a sample in which a reference measurement is problematic.

Referring to FIG. 3, in an embodiment, sample data from an aerated sample plotting light output over time is illustrated. The sample data from FIG. 3 is similar to FIG. 2, but with more noise, in this case from the and associated air within the sample. Note in this example that the trace has not reached a stable baseline within the sample settling phase, nor at the beginning of the reference measurement phase. For example, the sample may be a purified or filtered sample and under high pressure with a high level of air bubbles. Such a condition may fail the diagnostic test, and prevent an instrument from taking a measurement. For this example, chlorine was the analyte measured. Since the water source has chlorine removed, there is little to no change in the optical reading from the reference measurement to the sample measurement, and the air bubbles can exceed the true optical change from the chlorine. This issue can result in the analyte measurement being much lower, or to reach a negative value, than the actual concentration.

Figure 4:
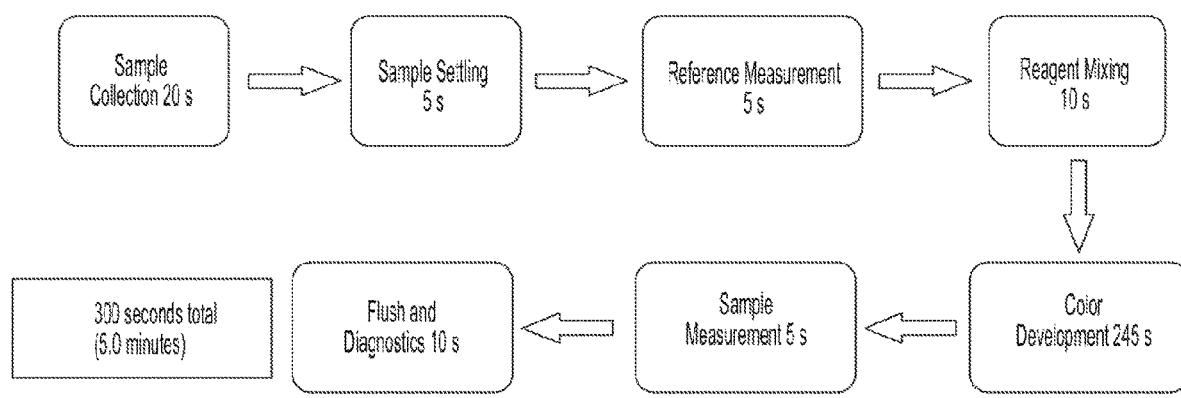
FIG. 4 illustrates a flow diagram of a simplified process analyzer measurement cycle in an embodiment.

Referring to FIG. 4, in an embodiment, a flow diagram of a simplified measurement cycle is illustrated. The flow diagram shows the process including: sample collection, sample, settling, reference measurement, reagent mixing, color development, sample measurement, and flush and diagnostics. The time periods for each step and total time are illustrative. A diagnostic measurement may be performed between the reference measurement and the reagent mixing steps. The diagnosis may determine the presence of bubble in the optical path. For example, if there are 3 bad measurements indicting bubbles out of 4 measurements, the system may output an alarm.

Figure 5:
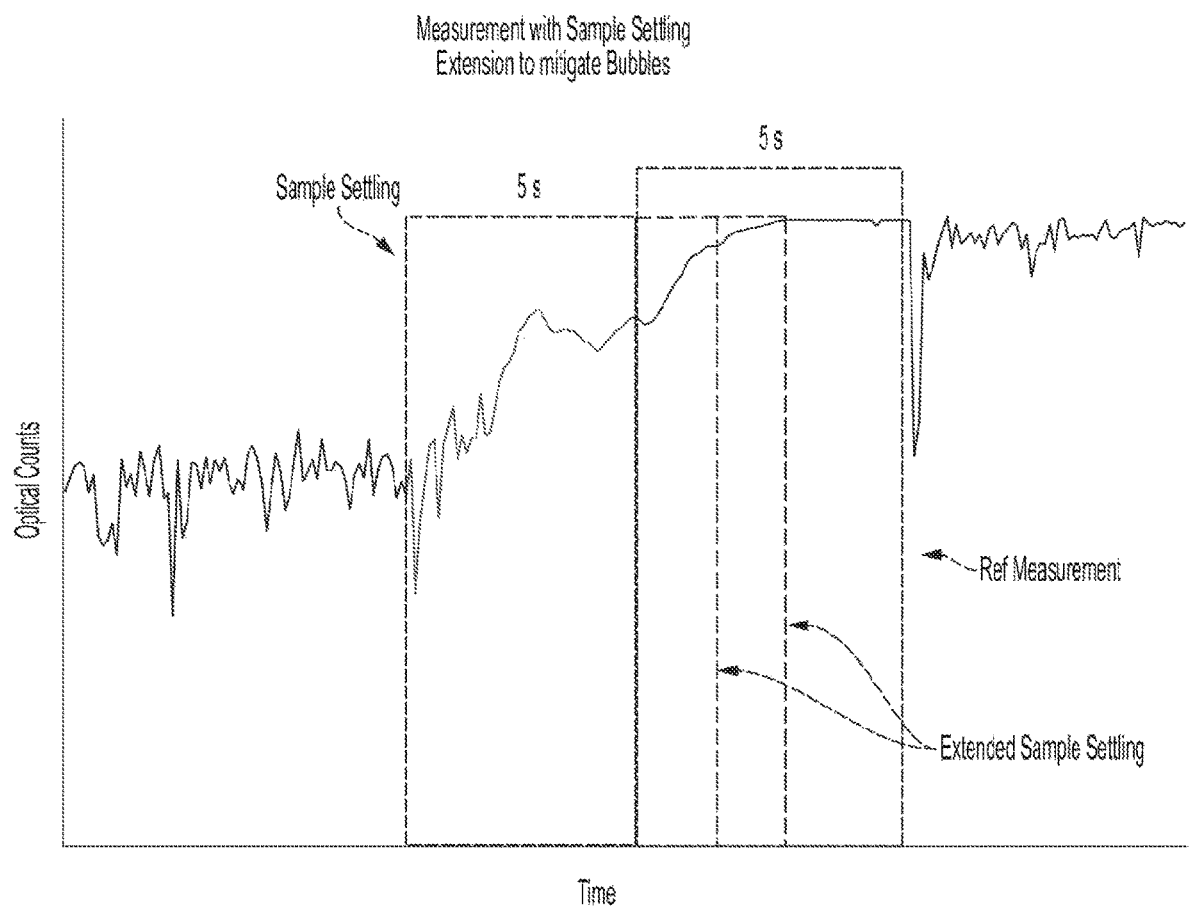
FIG. 5 illustrates an expanded view of example data of optical measurement over time for measuring an analyte of a sample in the presence of air bubbles by extending a reference measurement to achieve a stable signal.

Referring to FIG. 5, in an embodiment, a trace of optical measurement over time is illustrated. The trace is an enlargement (zoom in) of the FIG. 3 sample settling and reference measurement for clarity. The dashed lines within the reference measurement section represent potential increases to the sample settling phase to reach more stable conditions. In other words, adding time to the sample settling allows the optical measurement to reach a baseline as bubbles or particles clear the optical path so a more accurate reference measurement may be determined. Thus, even a sample with changing turbidity may be measured accurately by adding time to a sample settling. In an embodiment, the system and method may automatically perform a measurement or make a diagnosis to wait longer in the sample settling before proceeding to the reference measurement. In an embodiment, the delay or addition of the time to the sample settling may be added to the entire process. In an embodiment, the delay or addition of the time to the sample settling may not add any extra time to the entire measurement process.

Figure 6:
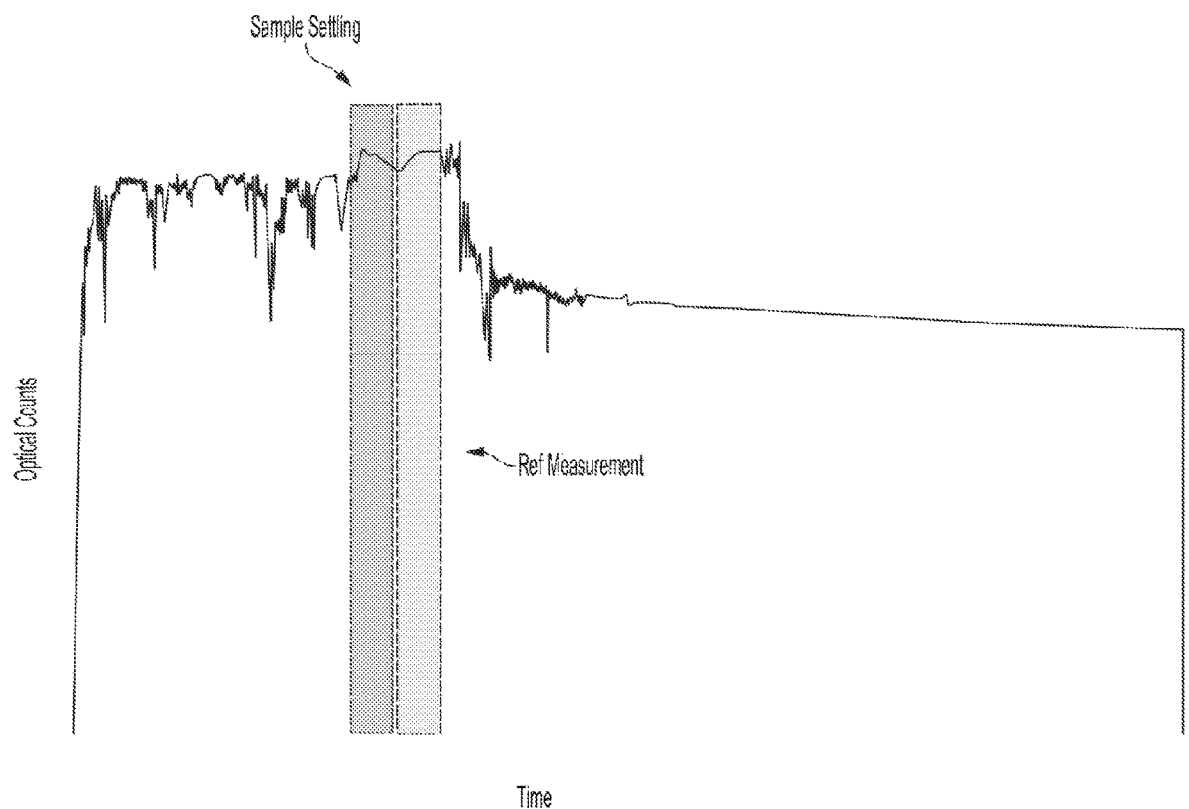
FIG. 6 illustrates example data of optical measurement over time for measuring an analyte of a sample in the presence of biofilm in which a reference measurement is problematic.

Referring to FIG. 6, in an embodiment, a trace of optical measurement over time in the presence of biofilm is illustrated. Note that the baseline is unstable over time in the sample settling phase, but in a manner different from air bubbles alone. It is possible that biofilm and other factors, instead of or in addition to air bubbles may disrupt an optical path. The biofilm may be present in a measurement chamber upon any surface that may interfere with the optical path. The biofilm may wick some sample volume up the side of the chamber to a drain, and cause the meniscus to lower. Thus, the instability in the optical measurement may be due to biofilm. In an embodiment, the system and method may allow more accurate measurement in the presence of biofilm in addition to or instead of just bubbles in the sample. The techniques presented here help to establish a stable baseline prior to performing a reference measurement. Instability of optical measurement may be in the form of air bubbles, particles, biofilm, or any other condition of a sample that may disrupt an optical measurement.

Figure 7:
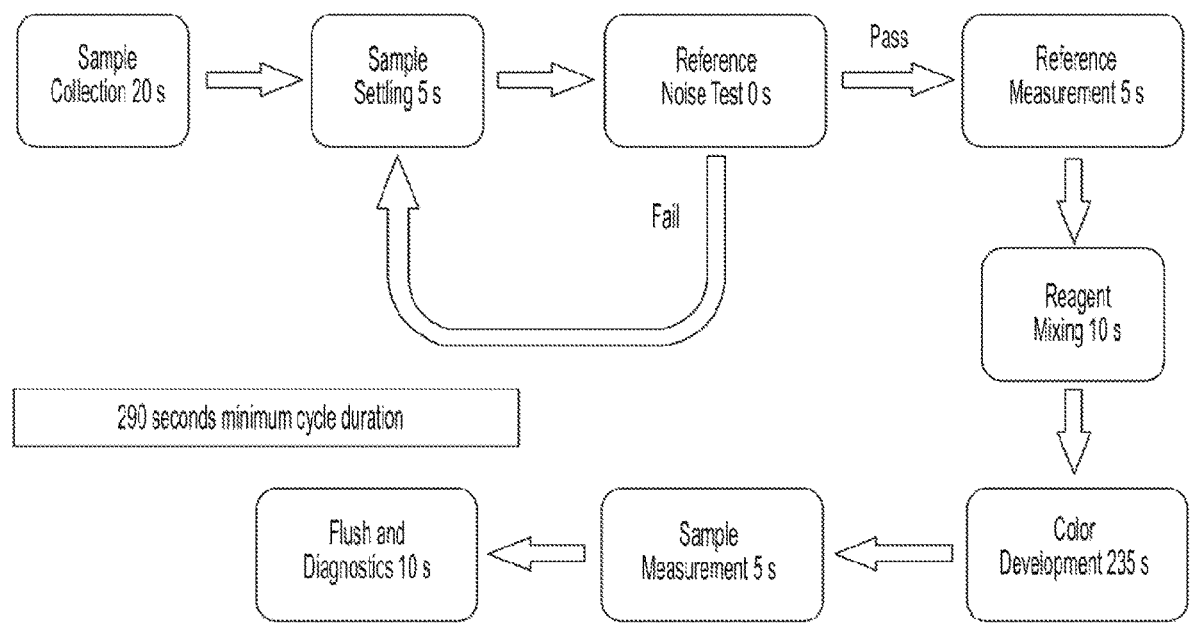
FIG. 7 illustrates a flow diagram of a process analyzer measurement cycle with a noise loop measurement cycle of a variable length in an embodiment.

Referring to FIG. 7, in an embodiment, a flow diagram of a measurement cycle with a noise loop is illustrated. In an embodiment, the cycle length may be variable. For example, if a determination is made that noise persists at the reference measurement, a loop may be introduced. For this example, a 5 second time duration may be added to wait for the noise associated with changing turbidity to subside. Upon a "Pass" the method and system may proceed to a reference measurement. The time loop may be fixed or variable. The time loop may be set by a user, predetermined, or controlled by the system based upon a sample, temperature, analyte to be measured, or the like. If a noise test is passed, the method may proceed to the reference measurement and subsequent steps. In other words, the entire cycle may be extended to allow sample settling and the turbidity to clear before proceeding.

Figure 8:
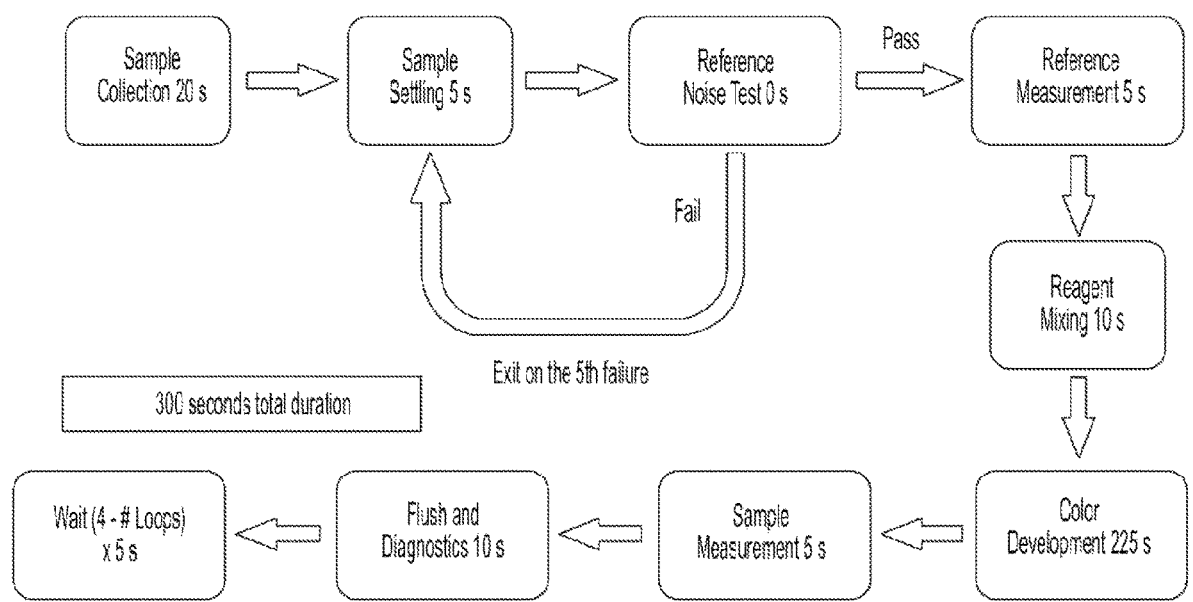
FIG. 8 illustrates a flow diagram of a process analyzer measurement cycle with a noise loop measurement cycle of a fixed length in an embodiment.

Referring to FIG. 8, in an embodiment, a flow diagram of another measurement cycle with a noise test loop is illustrated. In an embodiment, the cycle length may be fixed. In an embodiment, the system may exit upon a number of failures, such as the fifth failure for example. In other words, the system and method may proceed to a noise reference test, and if there is a failure, the system loops. The time loop may be set by a user, predetermined, or controlled by the system based upon a sample, temperature, analyte to be measured, or the like. In an embodiment, the system or method may loop a set number of times or may exit upon a set number of failed attempts of a measurement. In an embodiment, a wait may be introduced by multiplying the number of loops performed by the duration.

Figure 9:
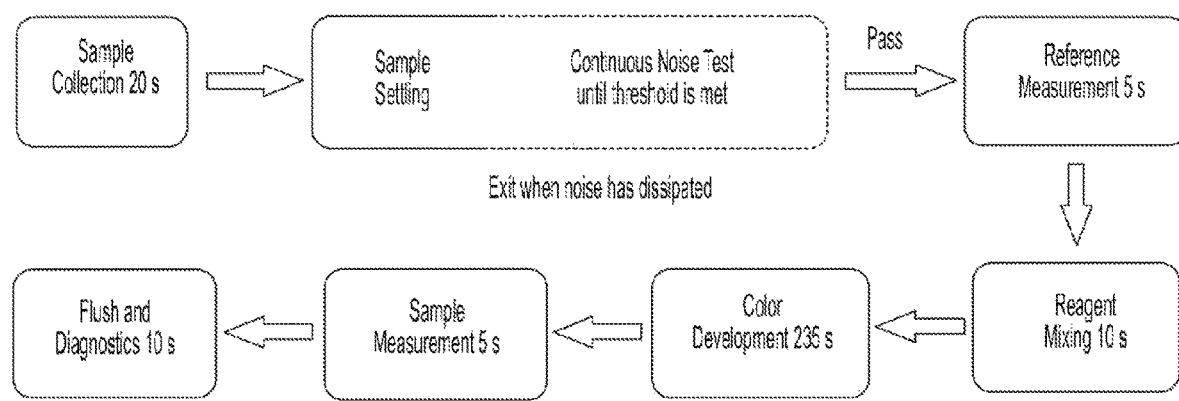
FIG. 9 illustrates a flow diagram of a process analyzer measurement cycle with a rolling diagnostic cycle of a variable length in an embodiment.

Referring to FIG. 9, in an embodiment, a flow diagram of another measurement cycle with a continuous noise test loop is illustrated. In an embodiment, the noise test may continue until a threshold is met. In other words, instead of having a fixed addition of time added to a sample settling phase, the method extends the settling time while performing a continuous noise test. This process may continue until a threshold is met. The threshold may be in accordance to the method provided herein. In an embodiment, the detector output, for example from the optical detector, may be used as the data for a noise test. In an embodiment, the method may use data beginning with the last portion of the settling phase. For example, with a continuous test, the method may use data from the last set number of seconds, and the set time shifts along as more continuous time is added until the threshold is reached. Once a threshold for noise is met, the method may pass to the reference measurement phase. The user may select the noise threshold, length of time for calculating the noise test, and the like. The system may be configured for different parameters based upon the analyte to be tested, chemistry used, temperature, condition of the sample such as presence of bubbles, clarity, temperature, or the like. In an embodiment, the sample settling and reference measurement steps may remain as separate steps.

Figure 10:
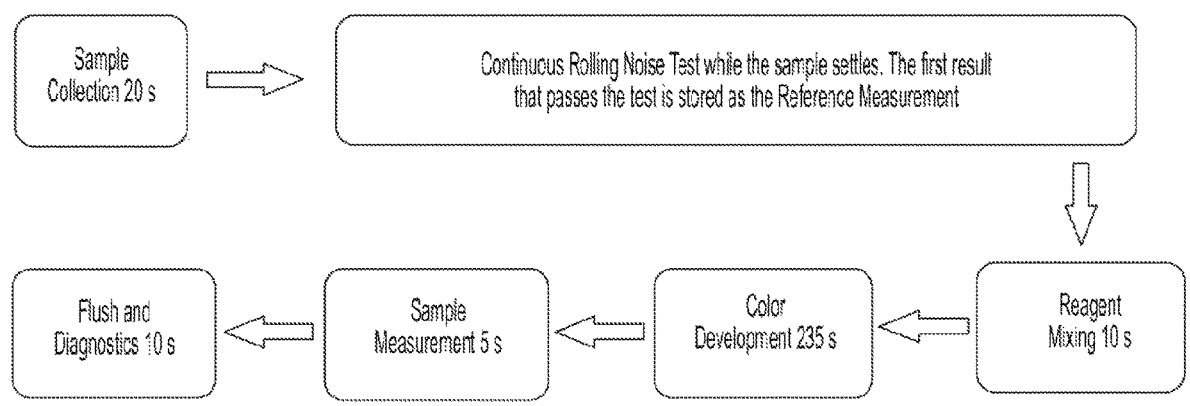
FIG. 10 illustrates a flow diagram of a process analyzer measurement cycle with a continuous rolling diagnostic and reference measurement cycle of a variable length in an embodiment.

Referring to FIG. 10, in an embodiment, a flow diagram of an embodiment which combines the sample settling and the reference measurement is illustrated. In other words, a continuous rolling noise test may occur while a sample settles, and the first result that passes the test (noise threshold) is the reference measurement. Once a sample becomes stable there may be no need to wait further time to perform a reference measurement. The continuous monitoring of the sample allows for use of data that passes a noise test to be used as a reference measurement.

In an embodiment, the method and system described above may be used for the sample measurement phase. In other words, the method in addition to establishing a stable baseline as measurement transition from sample settling to a reference measurement, may be used to determine if a stable baseline or threshold has been reached for a sample measurement. After a reference measurement, chemistry in the form of a colorimetric indicator for an analyte may be introduced. A length of time may be required for the chemistry to complete such that an accurate sample measurement may be taken. This length of time may vary based upon the chemistry, the analyte, temperature of the sample, condition of the sample, or the like.

In an embodiment, it may be advantageous to perform a sample measurement in the shortest period of time from the reference measurement to the sample measurement. The embodiments described herein may allow the method to determine a stable baseline is complete indicating a sample measurement may be taken. This may allow for faster results, increased sample measurement frequency, or the like while maintaining a desired level of accuracy. In other words, any of the embodiments described may be used to confirm that a sample measurement may be taken, even if that time is shorter than a conventional or set time. Therefore, a fixed reaction time, such as 2 or 3 minutes, may be shortened. The method or system may "learn" for a given analyte, sample, or the like, a shortened wait time to perform a sample measurement.

Alternatively or additionally, the method may forecast when a baseline may be stable for a sample measurement. A prediction may be based upon a slope of the optical reading trace. The monitoring of a baseline may be at fixed or continuous intervals. In an embodiment, the method may be similar to FIG. 10 in which the color development step and sample measurement step are combined as a continuous rolling noise test that is similar to that of the sample settling continuous rolling noise test. The continuous test may be a noise test and/or a slope measurement to look for a plateau or stable baseline prior to a sample measurement. As an example, some chemistry for a given analyte is slower and/or may slow at lower temperatures, however, this longer time may not be required in all measurement scenarios. Therefore, temperature regulation may not be required in a device reducing cost, maintenance, or the like. The system may adjust the wait time prior to a sample measurement. The adjustment may use data from the optical measurement to determine a stable baseline.

Additionally, in an embodiment, variations in colorimetric reaction times may be determined to obtain faster analyte measurement results. Different conditions may create variation in colorimetric reaction times. For example, a method may heat all samples so the reaction time is more predictable, then use a fixed reaction time. Or alternatively, use a fixed reaction time which includes the longest reaction times (due to cold samples or the presence of some species which are slower to react). In the future, an embodiment may use the existing optics with this new technique described herein to determine sample stability (from bubbles and particles) and colorimetric reaction progress toward completion and equilibrium.

Using the techniques described herein the method may avoid heating the sample if the customer or end user accepts a variable reaction time. Cold samples may take longer to reach reaction equilibrium, warm samples may reach reaction equilibrium faster. Reaction time can vary with seasonal conditions. Use of these techniques has the potential to avoid installation of a sample heater, thus decreasing the cost of the analyzer and reducing potential failure modes (heater problems related to staining and hardware degradation due to heating). Although the method and system described herein focus on process analyzers or colorimeters, these techniques could also be implemented into a benchtop spectrophotometer or any measurement device in which bubbles and particles in the sample and varying reaction times apply to lab methods.

Figure 11:
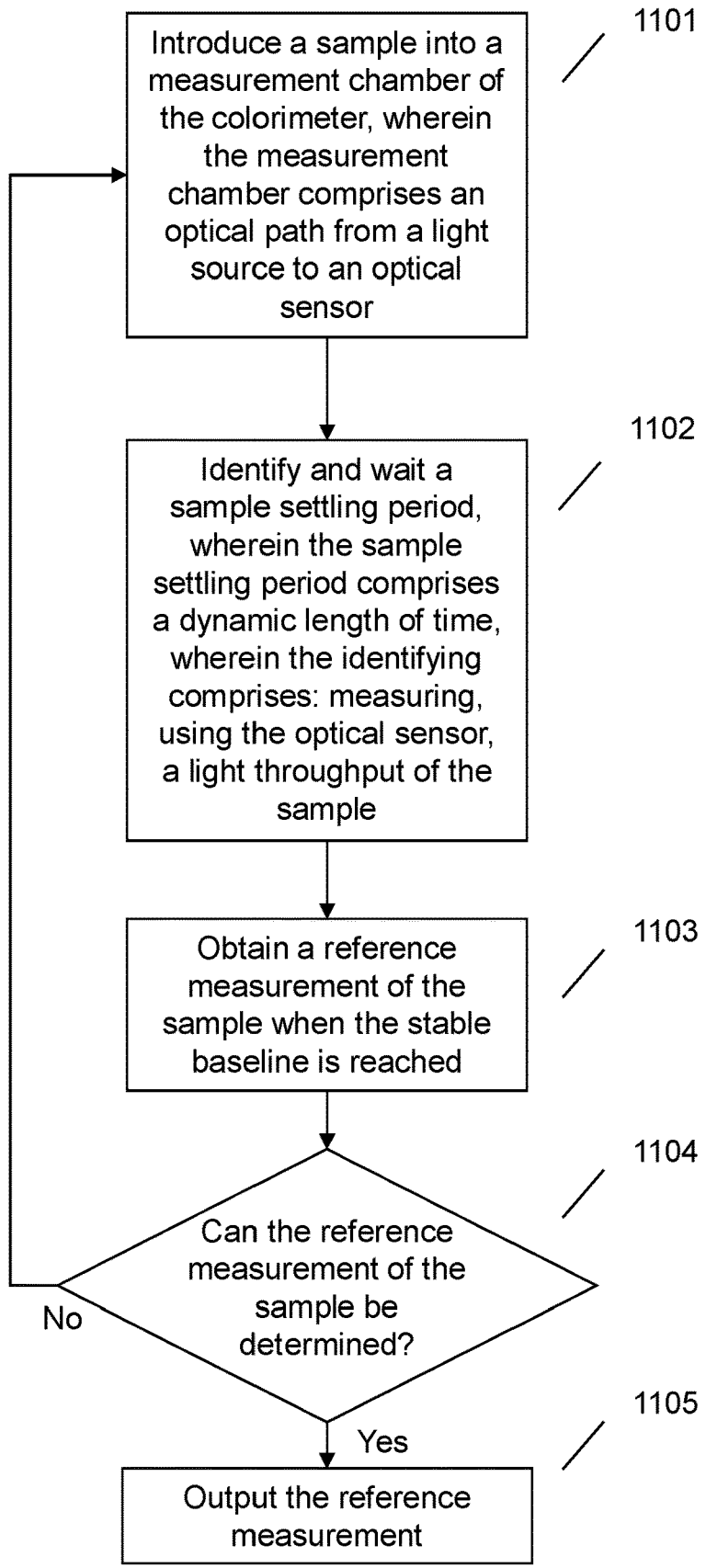
FIG. 11 illustrates flow diagram of measuring an analyte in a sample using optical measurement.

Referring to FIG. 11, an embodiment may measure an analyte of a sample. In an embodiment, the method or system may determine a stable baseline of optical reading has been reach for a stable reference and/or measurement for an analyte determination. At 1101, in an embodiment, a sample may be introduced into a measurement chamber or region. The measurement chamber may comprise an optical path from a light source to an optical sensor. The sample may be placed or introduced into a chamber manually by a user or using a mechanical means, for example, gravity flow, a pump, pressure, fluid flow, or the like. For example, a water sample for analyte measurement may be introduced to a chamber by a pump. In an embodiment, there may be one or more chambers in which the one or more method steps may be performed. In an embodiment, valves or the like may control the influx and efflux of the aqueous solution into or out of the one or more chambers, if present. Once the sample is introduced to the measurement system, the system may collect optical data from an optical sensor to determine the presence of adequate sample and/or an analyte in the sample.

At 1102, in an embodiment, the method and system may identify and wait a sample settling period. In an embodiment, the sample settling period may be a dynamic length of time. The dynamic length may be adjusted based upon the methods described herein. In an embodiment, the identifying may comprise measuring, using the optical sensor, a light throughput of the sample. A dynamic length of time may be used for a reference measurement and/or a sample measurement.

At 1103, in an embodiment, the method and system may obtain a reference measurement of the sample when the stable baseline is reached as described herein.

In an embodiment, at 1104, the method and system may determine a reference and/or sample measurement. For example, a sample measurement may be subtracted from a reference measurement after the chemistry of a colorimetric dye is completed. This determination may be made based upon the first and the second measured potentials. If a reference and/or sample measurement cannot be determined, for example, if a stable baseline has not been reached, the method may adjust the dynamic wait time to provide a stable baseline and/or noise below a threshold. The system may output such a failure in a manner described herein, wait for a stable baseline, cease measuring after a number of failures, or the like.

If, however, the reference and/or sample measurement may be determined at 1104, the system, at 1105, may output a concentration of an analyte, an optical reading of light throughput, or the like of the sample. In an embodiment, an output may be in the form of a display, storing the data to a memory device, sending the output through a connected or wireless system, printing the output, or the like. The system may be automated, meaning the system may automatically output the measurement or optical reading. The system may also have associated alarms, limits, or predetermined thresholds. For example, if a measured value reaches a threshold, the system may trigger an alarm, alert the system/personnel to a fault, alter the flow of the sample solution, or the like. Data may be analyzed in real-time, stored for later use, or any combination thereof.

The various embodiments described herein thus represent a technical improvement to conventional methods and instruments for optical measurement of an analyte in a sample. This is in contrast to conventional methods with limitations mentioned above. Such techniques provide a better method for optical measurement of an analyte in a sample.

Figure 12:
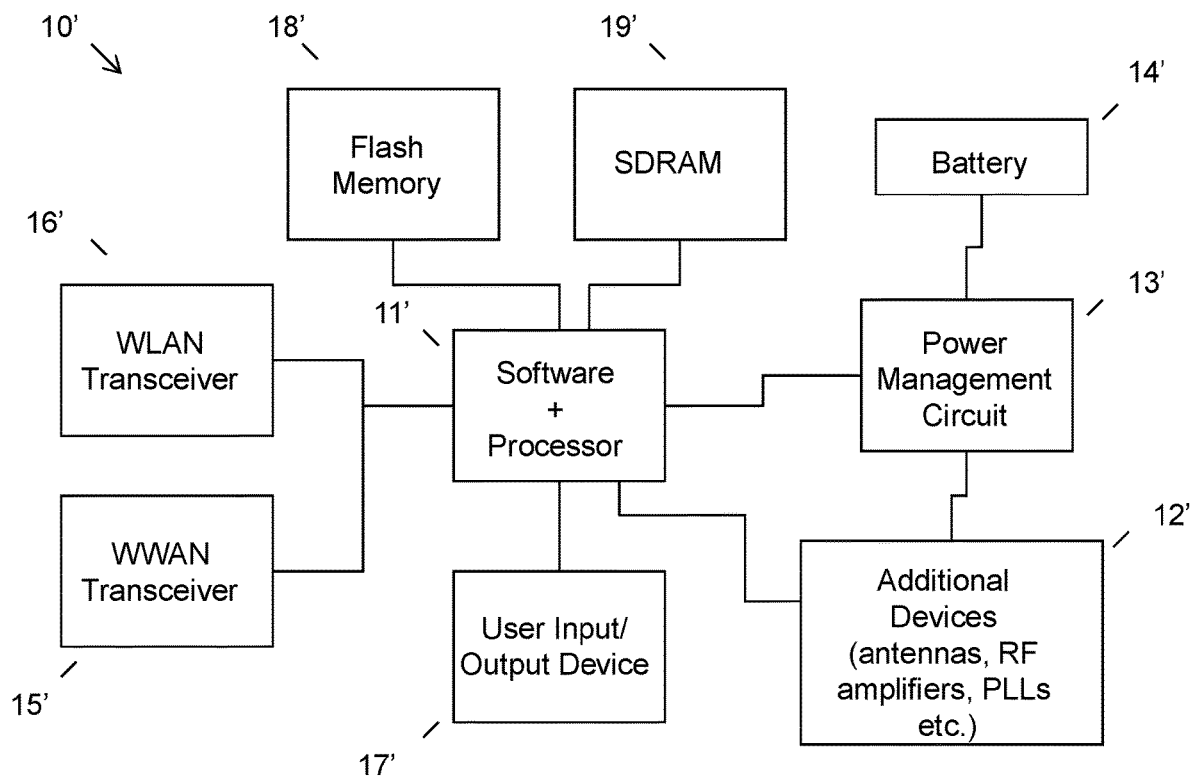
FIG. 12 illustrates an example of computer circuitry.

While various other circuits, circuitry or components may be utilized in information handling devices, with regard to an instrument for analyte measurement according to any one of the various embodiments described herein, an example is illustrated in FIG. 12. Device circuitry 10' may include a measurement system on a chip design found, for example, a particular computing platform (e.g., mobile computing, desktop computing, etc.) Software and processor(s) are combined in a single chip 11'. Processors comprise internal arithmetic units, registers, cache memory, busses, I/O ports, etc., as is well known in the art. Internal busses and the like depend on different vendors, but essentially all the peripheral devices (12') may attach to a single chip 11'. The circuitry 10' combines the processor, memory control, and I/O controller hub all into a single chip 11'. Also, systems 10' of this type do not typically use SATA or PCI or LPC. Common interfaces, for example, include SDIO and I2C.

There are power management chip(s) 13', e.g., a battery management unit, BMU, which manage power as supplied, for example, via a rechargeable battery 14', which may be recharged by a connection to a power source (not shown). In at least one design, a single chip, such as 11', is used to supply BIOS like functionality and DRAM memory.

System 10' typically includes one or more of a WWAN transceiver 15' and a WLAN transceiver 16' for connecting to various networks, such as telecommunications networks and wireless Internet devices, e.g., access points. Additionally, devices 12' are commonly included, e.g., a transmit and receive antenna, oscillators, PLLs, etc. System 10' includes input/output devices 17' for data input and display/rendering (e.g., a computing location located away from the single beam system that is easily accessible by a user). System 10' also typically includes various memory devices, for example flash memory 18' and SDRAM 19'.

It can be appreciated from the foregoing that electronic components of one or more systems or devices may include, but are not limited to, at least one processing unit, a memory, and a communication bus or communication means that couples various components including the memory to the processing unit(s). A system or device may include or have access to a variety of device readable media. System memory may include device readable storage media in the form of volatile and/or nonvolatile memory such as read only memory (ROM) and/or random access memory (RAM). By way of example, and not limitation, system memory may also include an operating system, application programs, other program modules, and program data. The disclosed system may be used in an embodiment of an instrument for analyte measurement.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device, where the instructions are executed by a processor.

In the context of this document, a storage device is not a signal and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and products according to various example embodiments. It will be understood that the actions and functionality may be implemented at least in part by program instructions. These program instructions may be provided to a processor of a device, e.g., a measurement device such as illustrated in FIG. 12, or other programmable data processing device to produce a machine, such that the instructions, which execute via a processor of the device, implement the functions/acts specified.

It is noted that the values provided herein are to be construed to include equivalent values as indicated by use of the term "about." The equivalent values will be evident to those having ordinary skill in the art, but at the least include values obtained by ordinary rounding of the last significant digit.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method for measuring an analyte of a sample using a colorimeter, comprising:
    introducing the sample into a measurement chamber of the colorimeter, wherein the measurement chamber comprises an optical path from a light source to an optical sensor;
    identifying and waiting a sample settling period, wherein the sample settling period comprises a dynamic length of time, wherein the identifying comprises:
        measuring, using the optical sensor, a light throughput of the sample; and
        determining, based upon the measuring, the light throughput has reached a stable baseline;
    averaging a portion of measured light throughput and calculating a noise level;
    performing a reference noise test by adding a fixed time to a cycle until reaching the stable baseline; and
    obtaining a reference measurement of the sample when the stable baseline is reached.

2. The method of claim 1, wherein the identifying comprises calculating a slope of the measured light throughput over time.

3. The method of claim 1, wherein the identifying comprises performing a reference noise test by adding a variable time to a cycle until reaching the stable baseline.

4. The method of claim 1, wherein the sample settling period comprises a continuous noise test until reaching the stable baseline.

5. The method of claim 1, wherein the sample settling period comprises a continuous noise test until reaching the stable baseline and using a portion of the continuous noise test data as the reference measurement.

6. The method of claim 1, further comprising performing another continuous noise test until reaching another stable baseline after a colorimetric indicator is added to the sample and using a portion of the another continuous noise test data as a sample measurement.

7. The method of claim 1, wherein the waiting allows changing turbidity in the sample to stabilize in the optical path.

8. The method of claim 1, wherein the waiting allows a meniscus of the sample to stabilize.

9. A measurement device for measuring an analyte of a sample using a colorimeter, comprising:
    a measurement chamber;
    a light source;
    an optical detector;
    a processor; and
    a memory device that stores instructions executable by the processor to:
    introduce the sample into the measurement chamber of the colorimeter, wherein the measurement chamber comprises an optical path from the light source to the optical sensor;
    identify and wait a sample settling period, wherein the sample settling period comprises a dynamic length of time, wherein the identifying comprises:
        measuring, using the optical sensor, a light throughput of the sample; and
        determining, based upon the measuring, the light throughput has reached a stable baseline;
    averaging a portion of measured light throughput and calculating a noise level;
    performing a reference noise test by adding a fixed time to a cycle until reaching the stable baseline; and
    obtain a reference measurement of the sample when the stable baseline is reached.

10. The device of claim 9, wherein the identifying comprises calculating a slope of the measured light throughput over time.

11. The device of claim 9, wherein the identifying comprises performing a reference noise test by adding a variable time to a cycle until reaching the stable baseline.

12. The device of claim 9, wherein the sample settling period comprises a continuous noise test until reaching the stable baseline.

13. The device of claim 9, wherein the sample settling period comprises a continuous noise test until reaching the stable baseline and using a portion of the continuous noise test data as the reference measurement.

14. The device of claim 9, further comprising performing another continuous noise test until reaching another stable baseline after a colorimetric indicator is added to the sample and using a portion of the another continuous noise test data as a sample measurement.

15. The device of claim 9, wherein the waiting allows changing turbidity in the sample to stabilize in the optical path.

16. A product for measuring an analyte of a sample using a colorimeter, comprising:
- a non-transitory storage device having code stored therewith, the code being executable by the processor and comprising:
- code that introduces the sample into a measurement chamber of the colorimeter, wherein the measurement chamber comprises an optical path from a light source to an optical sensor;
- code that identifies and waits a sample settling period, wherein the sample settling period comprises a dynamic length of time, wherein the identifying comprises:
    - measuring, using the optical sensor, a light throughput of the sample; and
    - determining, based upon the measuring, the light throughput has reached a stable baseline;
    - averaging a portion of measured light throughput and calculating a noise level;
    - performing a reference noise test by adding a fixed time to a cycle until reaching the stable baseline; and
- code that obtains a reference measurement of the sample when the stable baseline is reached.

* * * * *